(12) United States Patent
Amadi et al.

(10) Patent No.: US 10,231,552 B2
(45) Date of Patent: Mar. 19, 2019

(54) MODULAR BUILDING BLOCKS FOR FURNITURE

(71) Applicants: Laura Amadi, Ontario (CA); Rachel Doo, British Columbia (CA)

(72) Inventors: Laura Amadi, Ontario (CA); Rachel Doo, British Columbia (CA)

(*) Notice: Subject to any disclaimer, the term of this patent is extended or adjusted under 35 U.S.C. 154(b) by 0 days.

(21) Appl. No.: 15/632,685

(22) Filed: Jun. 26, 2017

(65) Prior Publication Data
US 2017/0367487 A1    Dec. 28, 2017

(30) Foreign Application Priority Data
Jun. 27, 2016   (CA) .................................... 2934175

(51) Int. Cl.
| | |
|---|---|
| *A47C 13/00* | (2006.01) |
| *A47B 47/04* | (2006.01) |
| *A47B 85/00* | (2006.01) |
| *A47B 87/00* | (2006.01) |
| *F16B 12/00* | (2006.01) |

(52) U.S. Cl.
CPC .......... *A47C 13/005* (2013.01); *A47B 47/047* (2013.01); *A47B 85/00* (2013.01); *A47B 87/005* (2013.01); *F16B 12/00* (2013.01)

(58) Field of Classification Search
CPC .. A47C 4/021; A47C 4/00; A47C 4/02; A47C 13/005; A47B 47/047; A47B 85/00; A47B 87/005; F16B 12/00
USPC ............... 297/440.1, 440.12, 440.13, 440.14
See application file for complete search history.

(56) References Cited

U.S. PATENT DOCUMENTS

| | | | | | |
|---|---|---|---|---|---|
| 1,379,648 | A | * | 5/1921 | Niebel | A63H 33/04 144/363 |
| 4,235,473 | A | * | 11/1980 | Aginar | A47C 4/022 297/440.19 |
| 2004/0201269 | A1 | * | 10/2004 | Tarantino | A47C 5/125 297/440.14 |
| 2005/0247241 | A1 | * | 11/2005 | Sherman | A47B 13/088 108/64 |
| 2012/0242200 | A1 | * | 9/2012 | Keragala | A47B 47/042 312/111 |
| 2015/0275517 | A1 | * | 10/2015 | Forman | A47D 11/00 52/596 |

(Continued)

OTHER PUBLICATIONS

Freshome, Dynamic and Versatile Modular Furniture Sets Your Creativity Free, web page <https://freshome.com/2012/11/06/dynamic-and-versatile-modular-furniture-sets-your-creativity-free/>, Nov. 6, 2012, 5 pages.

(Continued)

*Primary Examiner* — Mark R Wendell
(74) *Attorney, Agent, or Firm* — Stetina Brunda Garred and Brucker

(57) ABSTRACT

Modular building blocks may be used to provide furniture or other items. Each modular building block has a number of interleaved layers that provide first and second arms of the building block. Each modular building block comprises a first engageable finger section formed from one or more of the interleaved layers and a second engageable finger section formed from two or more interleaved layers. The second engageable finger section of one modular building block receives the first engageable finger section of another modular building block allowing various arrangements to be assembled.

20 Claims, 13 Drawing Sheets

(56) References Cited

U.S. PATENT DOCUMENTS

2017/0121973 A1* 5/2017 Brandao .................. E04C 1/00

OTHER PUBLICATIONS

Reinier De Jong, photograph of furniture <http://www.reinierdejong.com/wordpress/wp-content/uploads/2011/03/REK031.jpg>, retrieved from the Internet at least as early as Mar. 29, 2016.
Pinterest, photograph of furniture <https://www.pinterest.com/pin/340162578086945048/>, retrieved from the Internet at least as early as Mar. 29, 2016.
Pinterest, photograph of furniture <https://www.pinterest.com/pin/340162578086945004/>, retrieved from the Internet at least as early as Mar. 29, 2016.
Pinterest, photograph of furniture <https://www.pinterest.com/pin/340162578086944998/>, retrieved from the Internet at least as early as Mar. 29, 2016.
Pinterest, photograph of furniture <https://www.pinterest.com/pin/340162578086944966/>, retrieved from the Internet at least as early as Mar. 29, 2016.
Pinterest, photograph of furniture <https://www.pinterest.com/pin/340162578086944882/>, retrieved from the Internet at least as early as Mar. 29, 2016.
Pinterest, photograph of furniture <https://www.pinterest.com/pin/340162578086780663/>, retrieved from the Internet at least as early as Mar. 29, 2016.

* cited by examiner

200a

300

200b

300

200c

300

200d

300

MODULAR BUILDING BLOCKS FOR FURNITURE

CROSS-REFERENCE TO RELATED APPLICATIONS

The current application claims priority to Canadian patent application 2,934,175, filed Jun. 27, 2016 and entitled "MODULAR BUILDING BLOCKS FOR FURNITURE".

STATEMENT RE: FEDERALLY SPONSORED RESEARCH/DEVELOPMENT

Not Applicable

BACKGROUND

The current disclosure relates to furniture, and in particular to building blocks for furniture.

Furniture, such as chairs, benches, tables etc. have countless different designs with various forms providing different functionality. A piece of furniture may be built or assembled from a number of individual components. For example, a desk may be assembled by connecting a number of legs to a table top surface. The individual components of a piece of furniture may be re-used in providing other pieces of furniture. For example, a desk top surface may be used as a top of a shelving unit. Further, furniture may be reconfigurable to provide different designs and functionality. For example, a couch may be reconfigured to provide a bed.

It would be desirable to have additional and/or alternative furniture designs.

BRIEF SUMMARY

In accordance with the present disclosure there is provided a modular building block for use in assembling furniture, the modular building block comprising: a plurality of interleaved layers providing first and second arms and comprising: a first engageable finger section formed from one or more of the interleaved layers; and a second engageable finger section formed from two or more interleaved layers, wherein the second engageable finger section receives the first engageable finger section of another modular building block when assembling the furniture.

In a further embodiment of the modular building block, the modular building block has a shape selected from the group consisting of: a "T" shape; a square shape; a "C" shape; and an "S" shape.

In a further embodiment of the modular building block, each of the plurality interleaved layers for each shape of the group is formed from an "L" shaped basic building block.

In a further embodiment of the modular building block, one or more edges of the "L" shape are curved.

In a further embodiment of the modular building block, the modular building block is T shaped and the first engageable finger section is formed in a first arm of the T and the second engageable finger section is formed in another arm of the T that is parallel to and collinear with the first arm.

In a further embodiment of the modular building block, the modular building block is square shaped and the first engageable finger section is formed in a first section of the square shape formed from a first set of two arms connected at right angles, each arm of the first set of two arms is provided by different interleaved layers and the second engageable finger section is formed in a second section of the square shape formed from a second set of two arms connected at right angles, each arm of the second set of two arms is provided by different interleaved layers.

In a further embodiment of the modular building block, the modular building block is C shaped and the first engageable finger section is formed in a first arm of the C and the second engageable finger section is formed in another arm of the C that is parallel to and offset from the first arm, with the first engageable finger section and the second engageable finger section located on opposite sides of an overlapping section of the interleaved layers.

In a further embodiment of the modular building block, the modular building block is S shaped and the first engageable finger section is formed in a first arm of the S and the second engageable finger section is formed in another arm of the S that is parallel to and offset from the first arm, with the first engageable finger section and the second engageable finger section located on a same side of an overlapping section of the interleaved layers.

In a further embodiment of the modular building block, the first and second arms are arranged approximately perpendicular to each other.

In a further embodiment of the modular building block, the modular building block is formed from a unitary piece of material.

In a further embodiment of the modular building block, the modular building block is formed from separate interleaved layers joined together.

In a further embodiment of the modular building block, the separate interleaved layers are joined together by one or more of: an adhesive; a magnet; a detent; and a mechanical fastener.

In a further embodiment, the modular building block further comprises a substantially continuous surface attached to a face of the modular building block.

In accordance with the present disclosure there is further provided a kit for assembling a piece of furniture comprising: at least two modular building blocks according to the modular building block embodiments described above.

In a further embodiment of the kit, the at least two modular building blocks comprise at least two different shapes.

In a further embodiment of the kit, the at least two different shapes are selected from the group consisting of: a "T" shape; a square shape; a "C" shape; and an "S" shape.

In a further embodiment, the kit further comprises at least one additional building block comprising an engageable finger section formed from interleaved layers having a shape other than an L shape.

In a further embodiment, the kit further comprises a substantially continuous surface to be attached to a surface of at least one of the at least two modular building blocks.

In a further embodiment, the kit further comprises one or more attachment means for securing at least two of the modular building blocks together.

In a further embodiment of the kit, the attachment means comprises at least one of: an adhesive; a magnet; a detent; and a mechanical fastener.

In a further embodiment of the kit, the mechanical fastener comprises a rod securable through aligned holes passing through the first engageable finger section of a first one of the at least two modular building blocks and the second engageable finger section of a second one of the at least two modular building blocks.

In a further embodiment of the kit, the furniture assembled from the kit is reconfigurable and comprises a first configuration of the at least two modular building blocks providing a first functionality to the furniture and a second configuration of the at least two modular building blocks providing a second functionality to the furniture.

In a further embodiment of the kit, the first configuration comprises a coffee table, and the second configuration comprises a plurality of stools and a table.

In a further embodiment of the kit, the first configuration comprises a bench, and the second configuration comprises a chair and foot stool.

In accordance with the present disclosure there is further provided a piece of furniture assembled from a plurality of modular building blocks according to the modular building block embodiments described above.

BRIEF DESCRIPTION OF THE DRAWINGS

Embodiments are described herein with reference to the appended drawings, in which.

DETAILED DESCRIPTION

Different pieces of furniture may be assembled from modular building blocks of different shapes. The modular building blocks may be formed from a common basic building block. The basic building block may be stacked in varying arrangements to provide modular building blocks of different shapes. Regardless of the shape of the modular building blocks, each comprises a first engageable finger section and a second engageable finger section. The first engageable finger section and the second engageable finger section of different modular blocks can engage with one another allowing the modular building blocks to be connected to each other to provide a piece of furniture. The number of different modular building blocks can be assembled in a variety of different arrangements to provide different pieces of furniture. Further, groups of modular building blocks may be re-configured in order to provide re-configurable pieces of furniture.

Figure 1A:
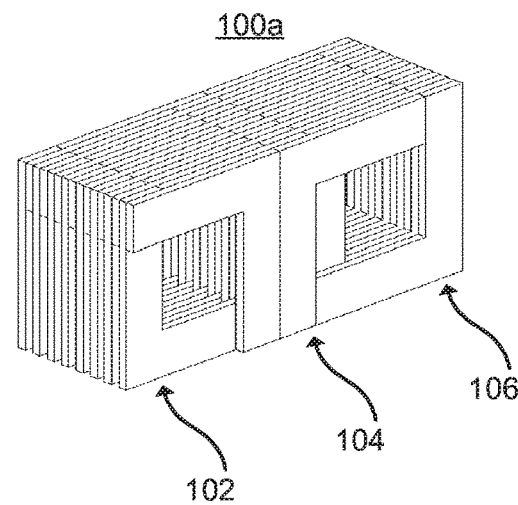
FIGS. 1A-1C depict reconfigurable modular building blocks providing different furniture configurations.
Figure 1B:
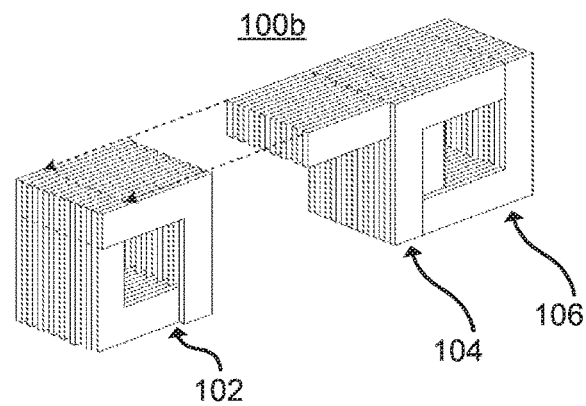
Figure 1C:
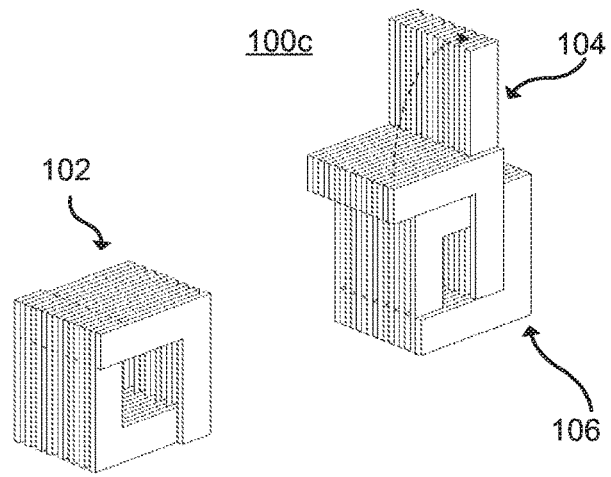

FIGS. 1A-1C depict reconfigurable modular building blocks providing different furniture configurations. FIG. 1A depicts three individual modular building blocks 102, 104, 106 arranged to provide a bench 100a. The modular building blocks 102, 104, 106 have a number of interacting finger sections that connect the individual modular building blocks together. The interacting finger sections are evident in FIG. 1B, which depicts the modular building block 102 being slid out from the bench 100a in an intermediate configuration. As is clear in FIG. 1B the modular building block has a square shape. The individual modular building block 102 may be used as a foot rest, stool or low table. As depicted in FIG. 1C, the modular building blocks 104, 106 may be re-configured by rotating the modular building block 104, which may have a T shape. The rotated modular building block 104 and the modular building block 106, which may have the same square shape as the modular building block 102, may provide a chair.

As depicted in FIGS. 1A-1C modular building blocks 102, 104, 106 may be configured to provide a first piece of furniture, which is depicted as a bench 100a. The modular building blocks 102, 104, 106 may be re-arranged, for example by sliding, rotating, moving, etc., in order to provide a foot rest and chair 100c. As described further, below a number of different shapes of modular building blocks are provided from interleaved layers of a basic building block shape in order to provide engageable finger sections that can engage with corresponding finger sections of other modular building blocks.

FIGS. 2A-2D depict isometric views of modular building blocks for use in building a piece of furniture. Each of the modular building blocks 200a, 200b, 200c, 200d (referred to collectively as modular building blocks 200) have a respective shape. However, regardless of the particular shape, each of the modular building blocks 200 comprise a similar structure. Each of the modular building blocks 200 is formed as a plurality of interleaved layers that provide at least two arms. Each of the modular building blocks comprise a first engageable finger section that is formed from one or more of the interleaved layers and a second engageable finger section that is formed from two or more interleaved layers. Each of the engageable finger sections provide a mechanism for connecting one building block to another in order to allow a plurality of the building to be assembled into pieces of furniture. For example, a second engageable finger section of a first modular building block can receive, and engage with, the first engageable finger section of another modular building block when building the piece of furniture. The engageable finger sections may provide engageable surfaces that contact each other and provide a friction fit for securing the building blocks together. Additional means for securing the connection between the modular building blocks may be used. For example, an adhesive, magnets, or detents may be used on or at the engageable surfaces of contacting engageable finger sections. Additionally, or alternatively, a mechanical fastener, such as a screw, a nail, a rod, etc., may be secured through the two engageable finger sections.

Figure 2A:
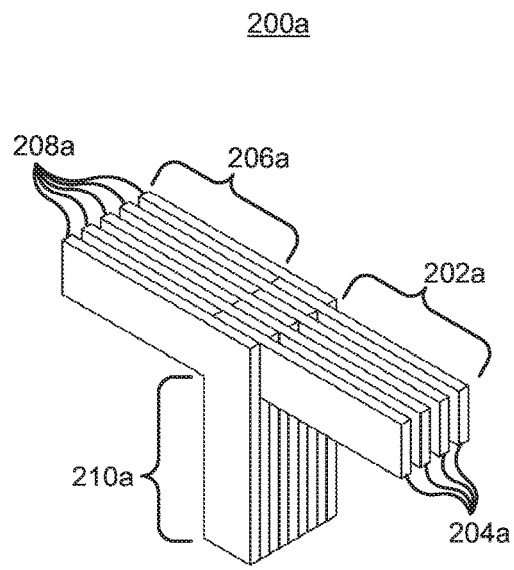
FIGS. 2A-2D depict isometric views of modular building blocks for use in building a piece of furniture.

Turning to FIG. 2A, the modular building block 200a is "T" shaped. As depicted, the modular building block 200a has a number interleaved layers that form the three arms of the T shape. The interleaved layers provide a spacing between adjacent layers and define a first engageable finger section 202a. The first engageable finger section 202a is formed by a number of the interleaved layers 204a. A second engageable finger section 206a is formed from other interleaved layers 208a. As depicted, the interleaved layers 204a of the first engageable finger section 202a are separated from each other by the interleaved layers 208a of the second engageable finger section 206a. Similarly, the interleaved layers 208a of the second engageable finger section 206a are separated from each other by the interleaved layers 204a of the first engageable finger section 202a. The interleaved layers 204a, 208a overlap with each other at an overlapping section 210a. As depicted, the overlapping section 210a forms the vertical center arm of the T shape and each of the first engageable finger section 202a and second engageable finger section 206a provide a respective one of the horizontal arms. The first engageable finger section 202a and second engageable finger section 206a may be approximately parallel, and collinear, to each other and are located on opposite sides of the overlapping section 210a. The first engageable finger section 202a is depicted as being formed from four separated layers, while the second engageable finger section 206a is depicted as being formed from five separated layers. The finger sections may be formed from fewer layers or more layers, however, a minimum of three layers are required in order to provide a first engageable finger section that can be engaged by a second engageable finger section.

Figure 2B:
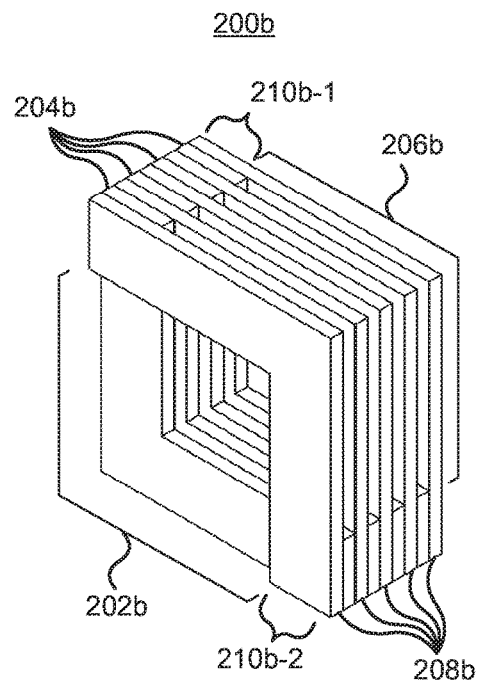

FIG. 2B depicts a modular building block having a square or "O" shape. Other than the different shape, the modular building block 200b is similar to the modular building block 200a and has a number interleaved layers that form the square shape. The interleaved layers provide a first set of separated layers providing a first engageable finger section 202b. The separated layers 204b forming the first engageable finger section 202b comprise two arms connected at each other at right angles forming connected sides of the square shape. Separated interleaved layers provide a second engageable finger section 206b. Similar to the layers 204b of the first engageable finger section 202b, the layers 208b forming the second engageable finger section 206b comprise two arms connected at each other at right angles forming connected sides of the square shape. The interleaved layers 204b, 208b overlap with each other at two corner overlapping sections 210b-1, 210b-2.

Figure 2C:
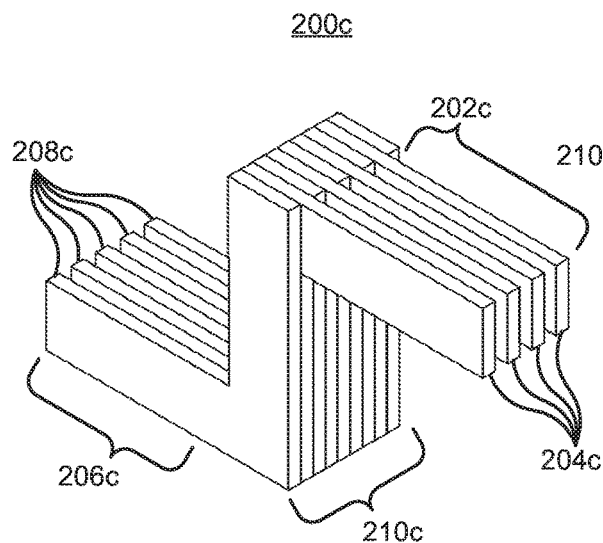

FIG. 2C depicts a modular building block having an "S" shape. Other than the different shape, the modular building block 200c is similar to the modular building block 200a, as well as the modular building block 200b, and has a number interleaved layers that form the S shape. The S shaped modular building block 200c comprises a first engageable finger section 202c formed from interleaved layers 204c that are separated from each other by intervening layers 208c. The layers 208c are similarly spaced apart by interleaved layers 204c and define a second engageable finger section 206c. The interleaved layers 204c, 208c overlap with each other at a central overlapping region 210c. The first engageable finger section 202c and the second engageable finger section 206c are located on opposite sides of the overlapping region 210c. The first engageable finger section 202c and the second engageable finger section 206c may be approximately parallel to each other, however they may be offset from each other at opposite ends of the overlapping region.

Figure 2D:
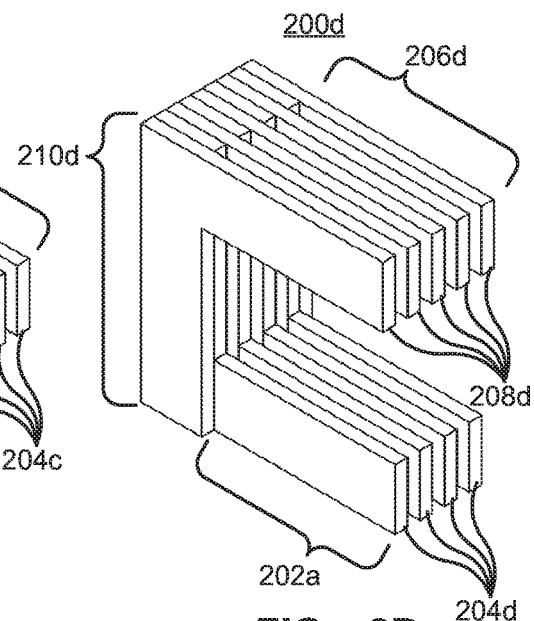

FIG. 2D depicts a modular building block having a "C" shape. Other than the different shape, the modular building block 200d is similar to the modular building block 200a, as well as the modular building blocks 200b, 200c, and has a number interleaved layers that form the C shape. The C shaped modular building block 200d comprises a first engageable finger section 202d and a second engageable finger section 206d formed from respective interleaved layers 204d and 208d. The interleaved layers 204d, 208d overlap with each other at a central overlapping region 210d, with the first engageable finger section 202d and the second engageable finger section 206d located on the same side of the overlapping region 210d. The first engageable finger section 202d and the second engageable finger section 206d may be approximately parallel to each other, however they may be offset from each other at opposite ends of the overlapping region.

FIGS. 2A-2D depict a number of different shapes of modular building blocks. Each of the modular building blocks described above are generally formed from a number of arms arranged at right angles to each other. Although a number of shapes have been described in detail, other shapes may be provided. The modular building blocks comprise first engageable finger sections and second engageable finger sections that can engage in a friction fit with the first engageable finger section of other modular blocks. Other shapes, possibly incorporating curved or arcuate sections or arms and possibly arranged at various angles may be provided that still have the engageable finger sections described above that allow the different shapes of the modular building blocks to engage with each other when assembling furniture or other objects.

The particular shapes of modular building blocks described above with reference to FIGS. 2A-2D are depicted as being formed from a plurality of interleaved layers, with each of the layers having the same shape. Although forming the layers from identical shapes, it is possible to provide various different shapes for the stacked interleaved layers.

Figure 3:
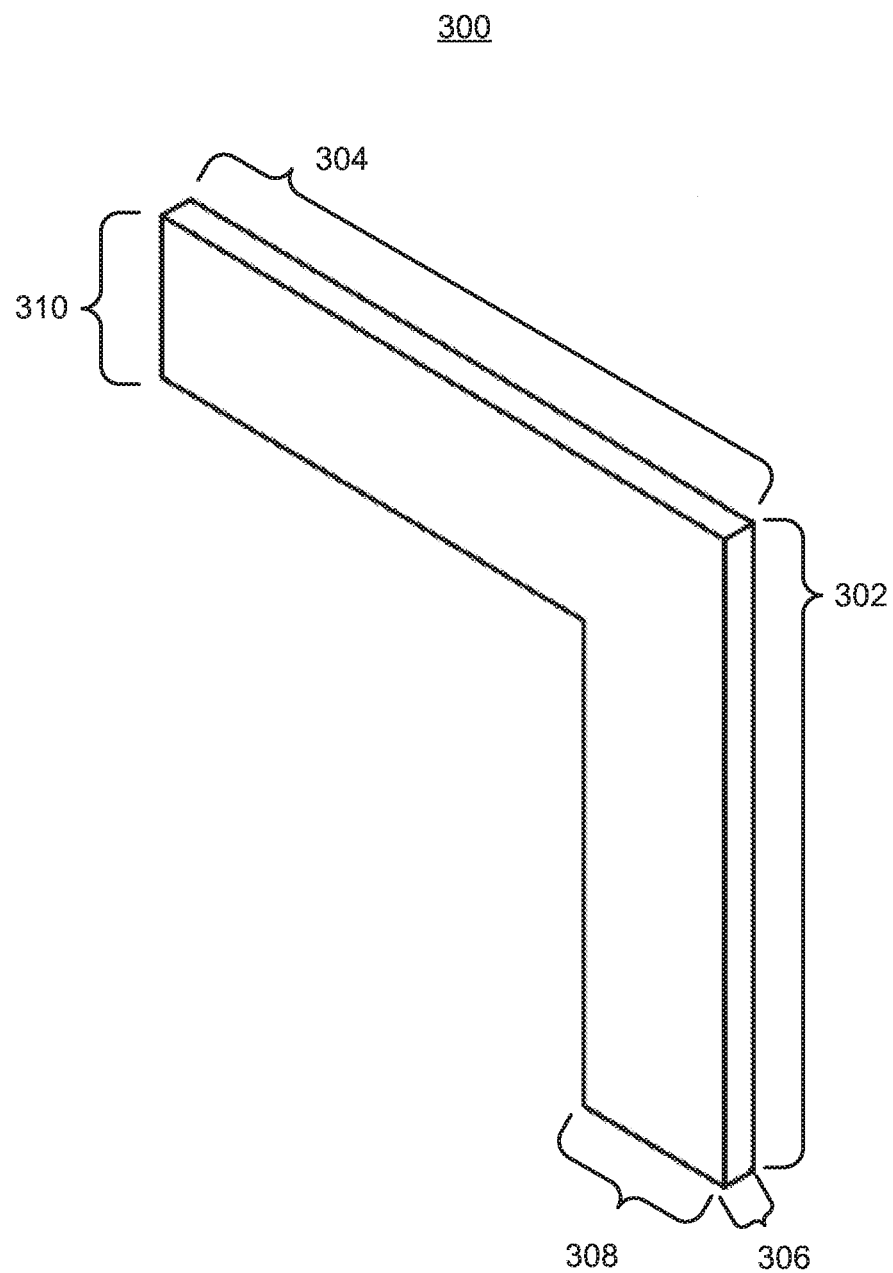
FIG. 3 depicts a basic building block that may be used in forming each of the modular building blocks of FIGS. 2A-2D.
Figure 4A:
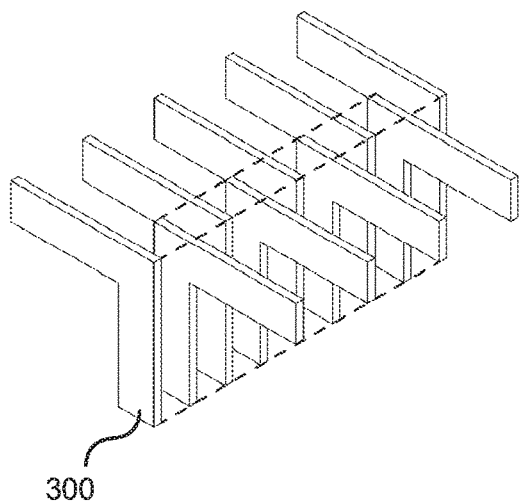
FIGS. 4A-4D depict the modular building blocks of FIGS. 2A-2D formed from the basic building block of FIG. 3.
Figure 4B:
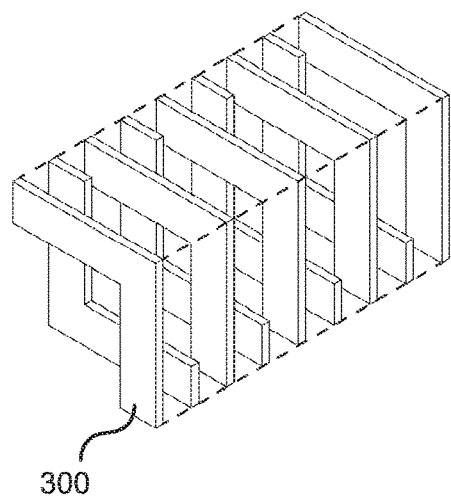
Figure 4C:
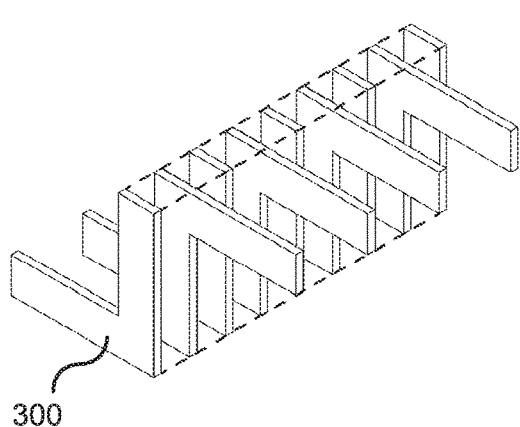
Figure 4D:
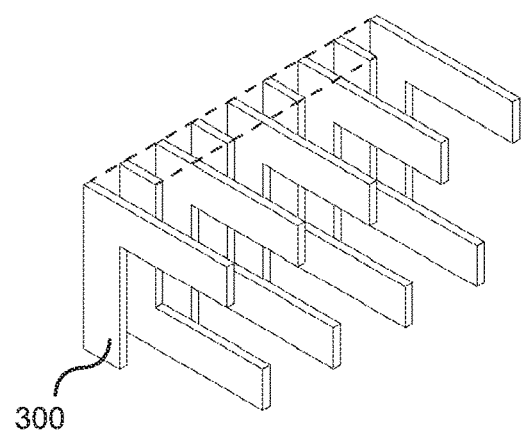

FIG. 3 depicts a basic building block that may be used in forming each of the modular building blocks of FIGS. 2A-2D. The basic building block 300 is L shaped with a first arm 302 connected to a second arm 304 at a right angle. The L shaped basic building block 300 has a particular thickness 306. The thickness 306 of the L shaped basic building block may be substantially constant over the entire shape in order to ensure that other layers that are separated by its thickness will provide a gap that is the same thickness of a finger that can be received within the gap. The two arms 302, 304 are depicted as having the same generally length; however, it is possible to provide one longer arm. Further, the arms 302, 304 are depicted as having a respective widths 308, 310 that are approximately equal to each other; however each arm 302, 304 may have a different width. Further, the L shape is depicted as having flat edges and square corners. It is possible to provide rounded, or other profiles, corners as well as providing curved or otherwise shaped edges to the L shaped basic building block 300.

FIGS. 4A-4D depict the modular building blocks of FIGS. 2A-2D formed from the basic building block of FIG. 3. As depicted in each of the FIGS. 4A-4D the modular building blocks 200a-200d may be formed by stacking individual L shaped basic building blocks together in alternating arrangements. For example, the T shaped building block 200a is formed by stacking alternating L shaped basic building blocks that have been flipped horizontally about a vertical arm of the L shape, and aligned so that the vertical arms are overlapping. The square shaped modular building block 200b is formed by stacking alternating L shaped building blocks that have been flipped both horizontally and vertically and arranged so that both ends of the L shaped basic building blocks overlap. The modular building block 200c is formed by stacking alternating L shaped building blocks that have been flipped both horizontally and vertically and arranged so that vertical arms of the basic building blocks overlap with each other. The modular building block 200d is formed by stacking alternating L shaped building blocks that have been flipped vertically and arranged so that vertical arms of the basic building blocks overlap with each other. The stacked interleaved layers of the basic building blocks may be secured to each other, for example using adhesives and/or mechanical fasteners. Further, depending upon the material used for the basic building blocks, they may be welded together.

The modular building blocks 200 are each depicted as being formed from the same number of layers of basic building blocks, namely nine layers. However, the modular building blocks may be formed from varying numbers of layers. The number of layers, along with the thickness of the layers, determines the overall width or thickness of the modular building block. While the building blocks are depicted as having the same width, building blocks of different widths can have varying widths and still be connected together.

FIGS. 4A-4D depict forming the modular building blocks 200 from individual layers of the same basic building block. While such an assembly technique is possible, the modular building blocks 200 having interleaved layers may also be formed using a variety of manufacturing techniques. For example, the modular building blocks could be 3D printed, CNC machined from a unitary or monolithic piece of material, or injection molded or cast.

Figure 5A:
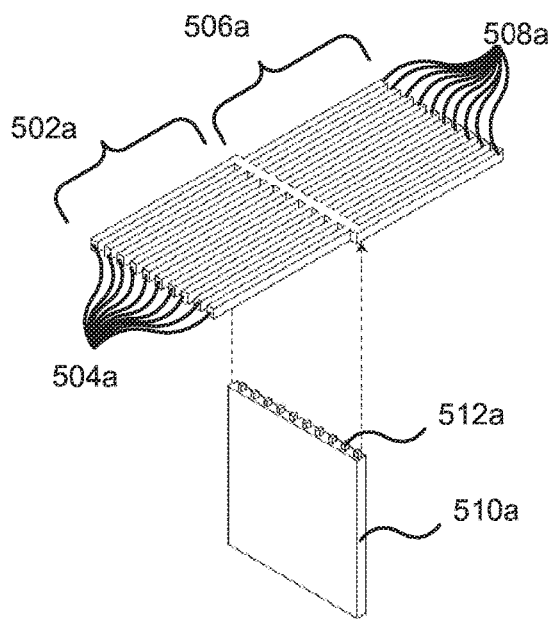
FIGS. 5A-5D depict forming modular building blocks.
Figure 5B:
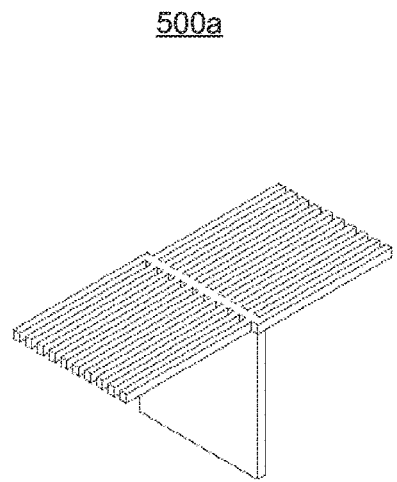
Figure 5C:
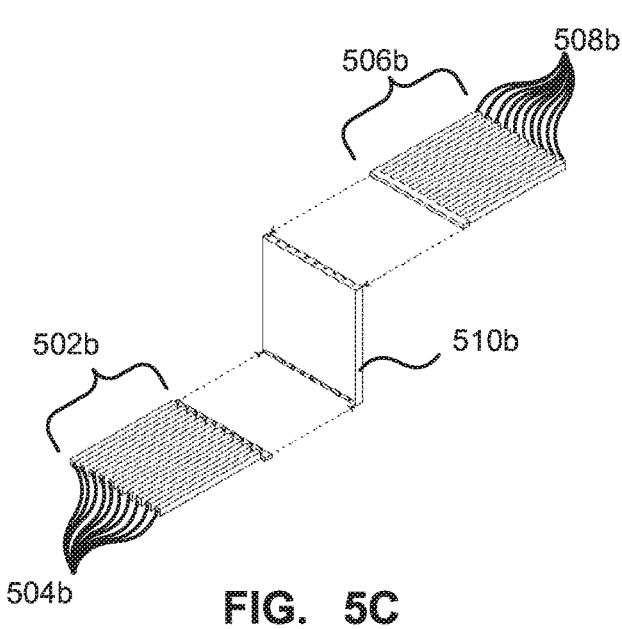

FIGS. 5A-5D depict forming modular building blocks. The modular building blocks 500a and 500b depicted in FIGS. 5B and 5D, respectively, do not require to be manufactured or formed from layers of the same basic building block, and may be respectively formed by connecting or joining components as shown in FIGS. 5A and 5C.

Turning to FIGS. 5A and 5B, the modular building block 500a is "T" shaped. As depicted in FIG. 5A, the modular building block 500a is formed by connecting a first engageable finger section 502a formed by a number of interleaved layers 504a and a second engageable finger section 506a formed by a number of interleaved layers 508a with a central piece 510a that forms the vertical center arm of the T shape. The central piece 510a may engage with the first and second engageable finger sections 502a and 506a to form the modular building block 500a. The central piece 510a is exemplary depicted as comprising a plurality of dowels 512a on an end surface for engaging with the first and second engageable finger sections 502a and 506a, however other connections are possible including friction or interference fits, adhesives, welds, etc.

Figure 5D:
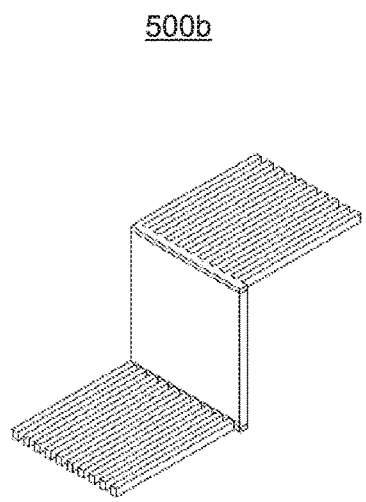

Turning to FIGS. 5C and 5D, the modular building block 500b is "S" shaped. Other than the different shape, the modular building block 500b is similar to the modular building block 500a. The modular building block 500b is formed by connecting a first engageable finger section 502b formed by a number of interleaved layers 504b and a second engageable finger section 506b formed by a number of interleaved layers 508b with a central piece 510b. The central piece 510b may engage with the first and second engageable finger sections 502b and 506b to form the modular building block 500b.

The central piece 510a and 510b may, for example, be a solid material, and/or a material that is not made of interleaved layers. As previously described, instead of the central piece 510a and 510b being made separately from the first and second engageable finger sections 502a, 506a, 502b, and 506a, the modular building blocks 500a and 500b may be 3D printed, CNC machined from a unitary or monolithic piece of material, or injection molded or cast, where the central piece 510a and 510b is formed as a single material and the first and second engageable finger sections 502a, 506a, 502b, and 506a are formed as interleaved layers.

While the modular building blocks 500a and 500b shown in FIGS. 5A-5D are depicted as being "T" shaped and "S" shaped, respectively, a person skilled in the art will readily appreciate that other shapes of modular building blocks, such as the "C" and "O" shaped modular building blocks described with reference to FIG. 2, may also be formed in a similar manner.

Figure 6:
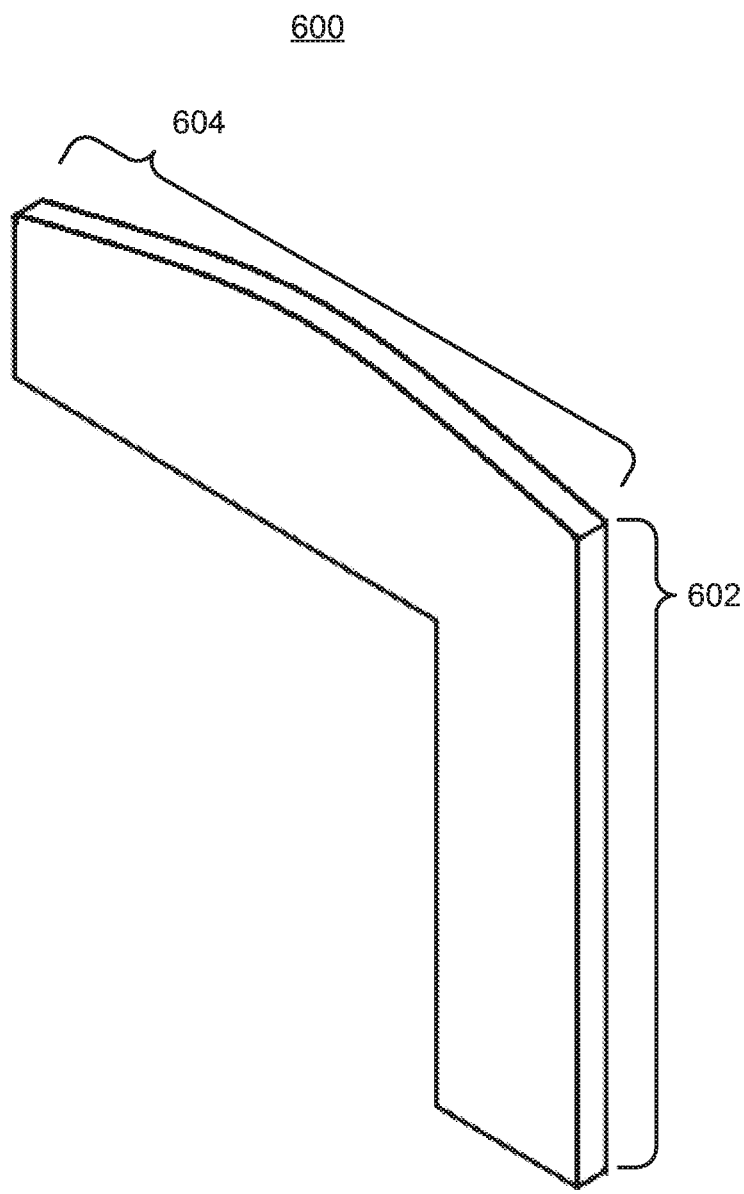
FIG. 6 depicts an alternative embodiment of basic building block.

FIG. 6 depicts an alternative embodiment of basic building block 300. As can be seen in FIG. 6, the "L" shaped basic building block 300, which included flat edges, can be altered by adding or removing material. This may be desirable for aesthetic and/or comfort reasons. The basic building block 600 has a first arm 602 connected at an approximately right angle to a second arm 604. The second arm 604 is depicted as having a convex top surface. It will be appreciated that the basic building block edges could also be concave, wavy, etc. The physical alterations to the edges of the "L" shaped basic building block 600 can be on any one of the edges of either arm and may be curved, concave, convex, wavy, etc.

Figure 7A:
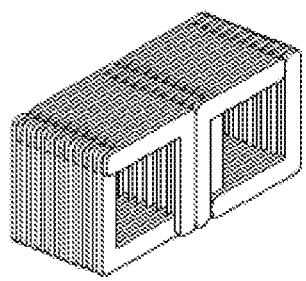
FIGS. 7A-7C depict modular building blocks formed from the basic building block of FIG. 6.
Figure 7B:
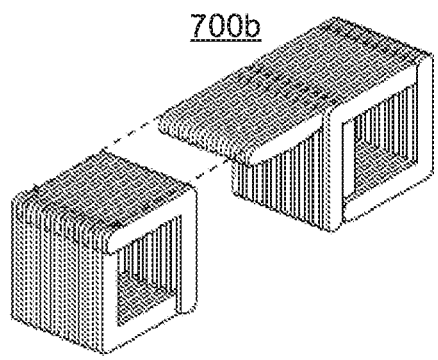
Figure 7C:
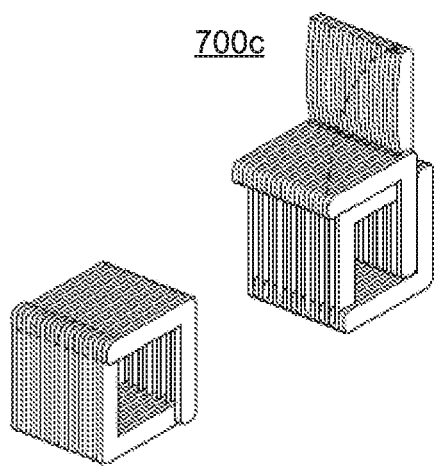

FIGS. 7A-7C depict further modular building blocks formed from a basic building block having non-straight edges. The modular building blocks are depicted as being formed from basic building blocks with curved edges and corners. The modular building blocks may form a bench 700a and be separated as depicted in 700b to form a foot rest and chair 700c, As can be seen in FIG. 7C the furniture configuration of the foot rest and chair 700c may provide extra comfort by using a basic building block that has a curved edges.

Figure 8A:
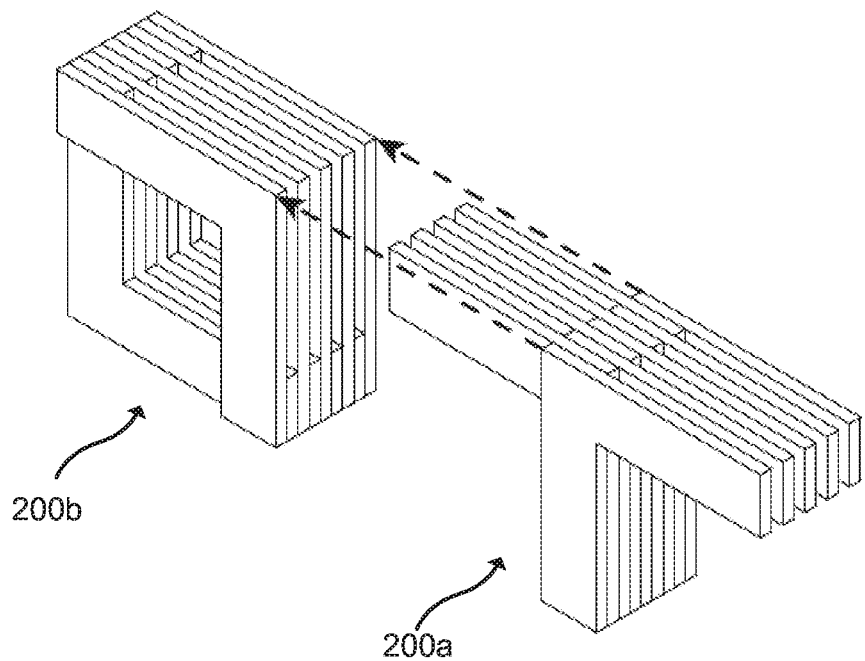
FIGS. 8A and 8B depicts two interlocking modular building blocks.
Figure 8B:
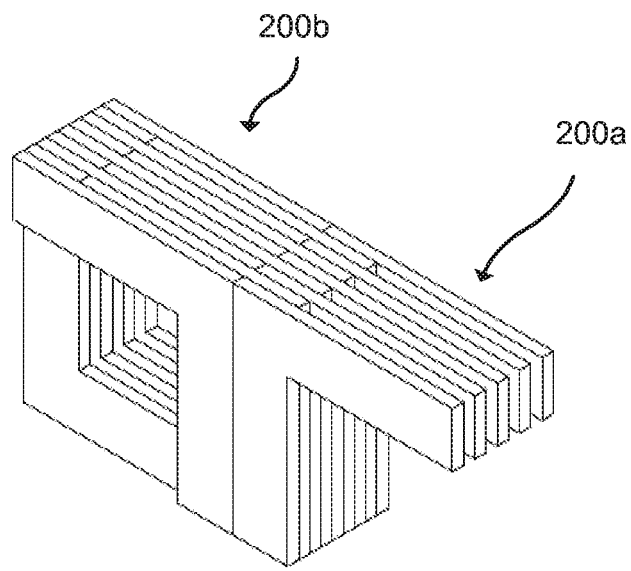
Figure 9A:
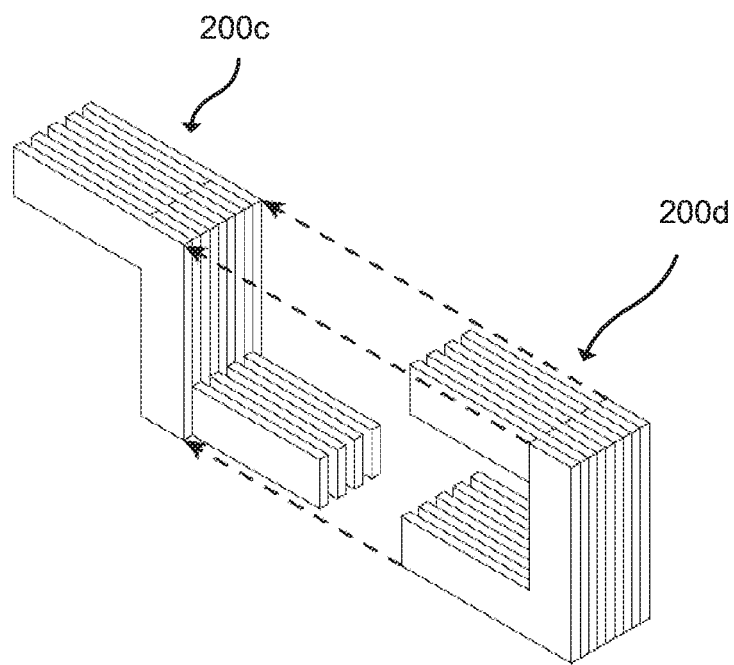
FIGS. 9A and 9B depicts two further interlocking modular building blocks.
Figure 9B:
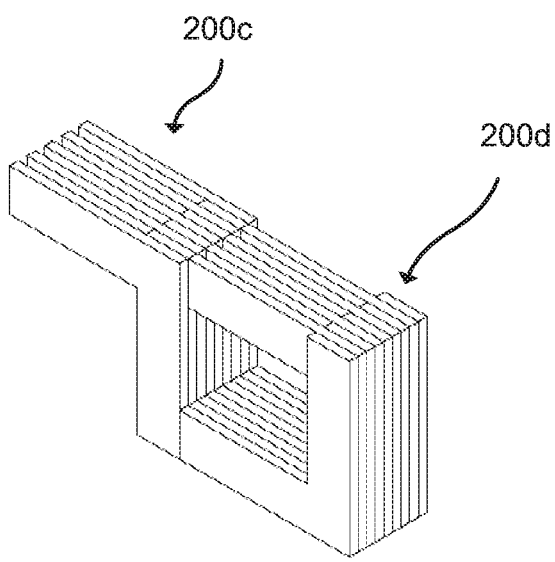
Figure 10A:
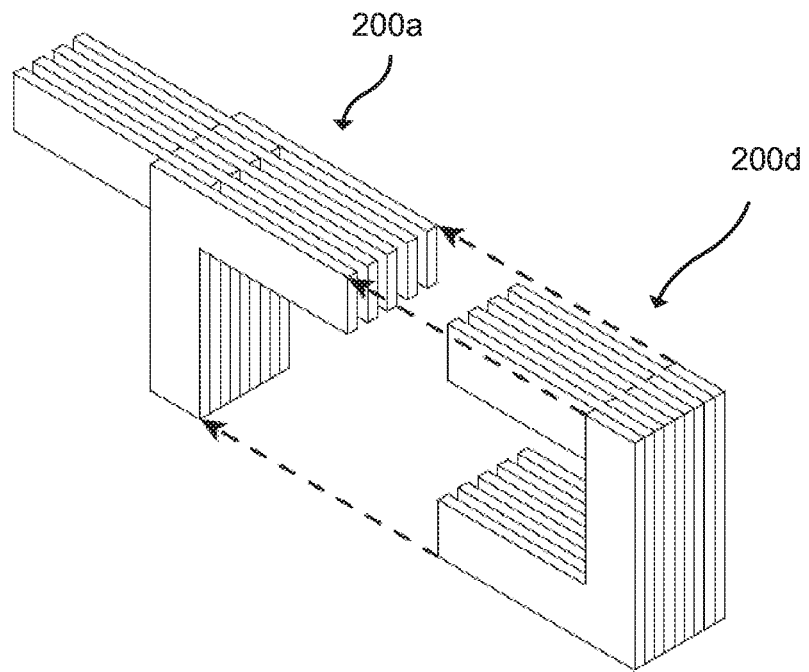
FIGS. 10A and 10B depicts two further interlocking modular building blocks.
Figure 10B:
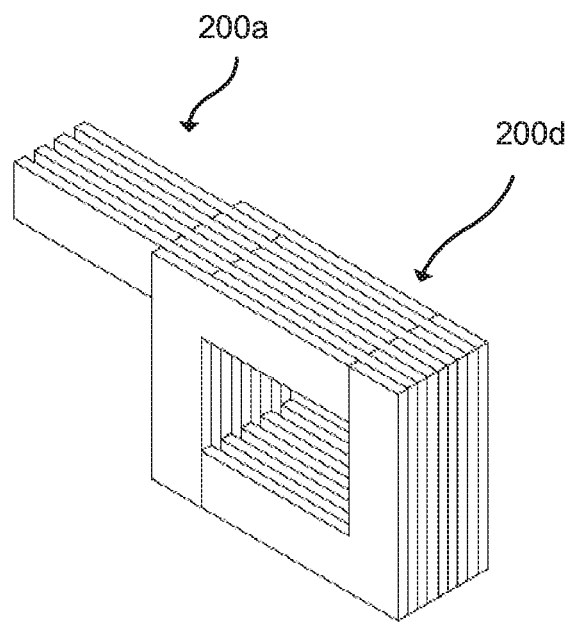
Figure 11A:
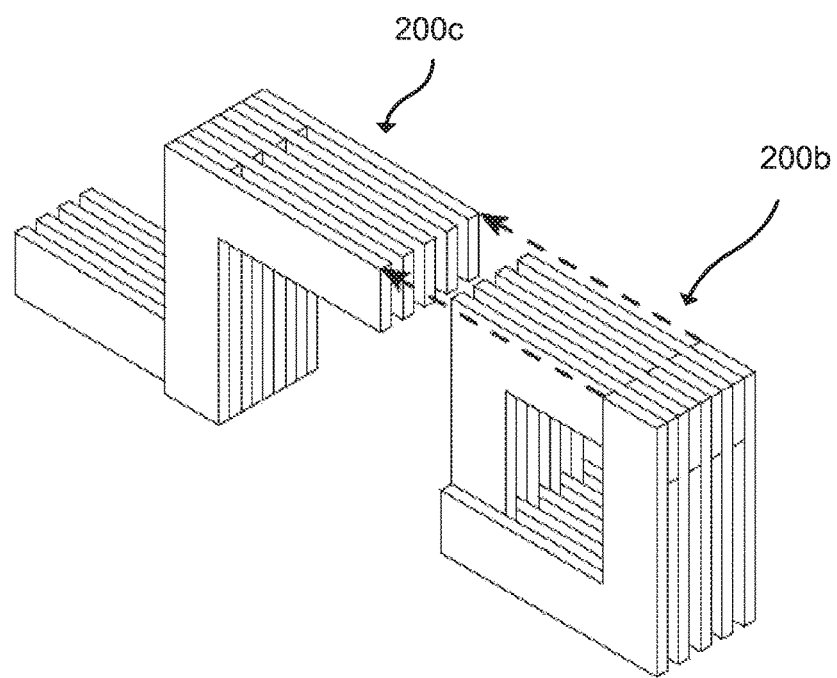
FIGS. 11A and 11B depicts two further interlocking modular building blocks.
Figure 11B:
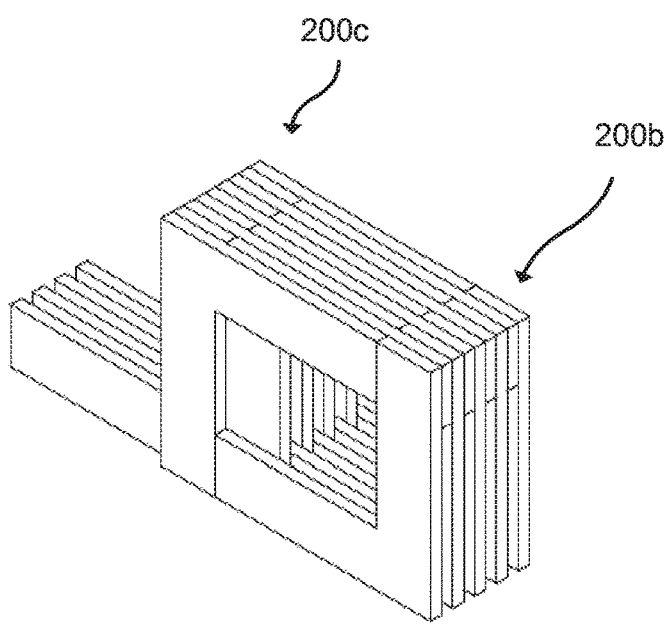
Figure 12A:
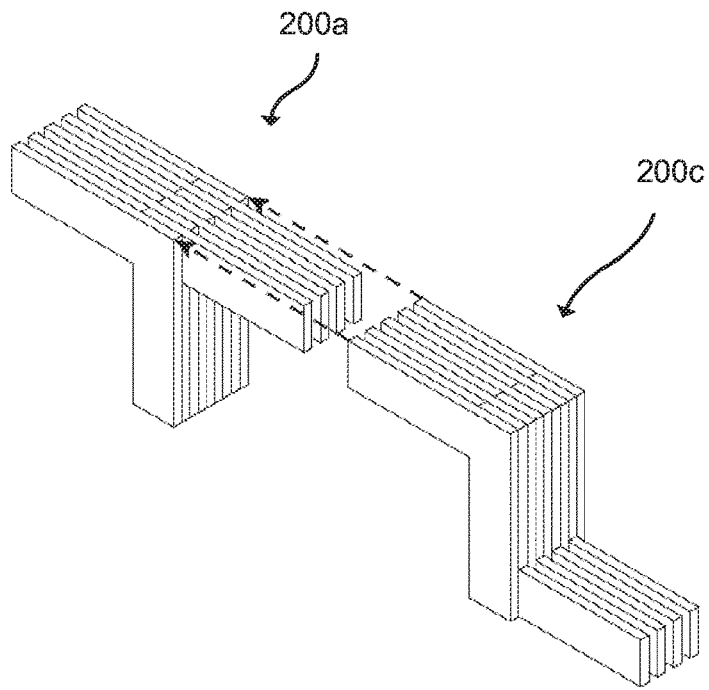
FIGS. 12A and 12B depicts two further interlocking modular building blocks.
Figure 12B:
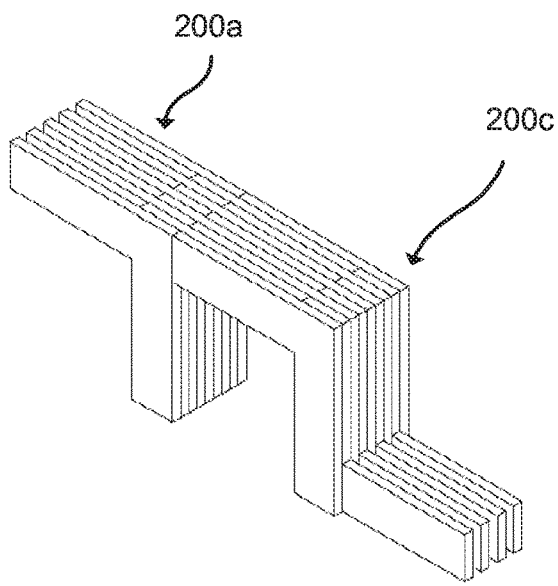

Regardless of the manufacturing technique used to form the different shapes of the modular building blocks, the interleaved layers provide first engageable finger sections that can engage, and provide a friction fit with, second engageable finger sections of other modular building blocks. FIGS. 8A-12B depict various modular building block shapes engaging with each other. FIGS. 8A and 8B depicts two interlocking modular building blocks. In particular, FIGS. 8A and 8B depict a T shaped building block 200a sliding into a square shaped building block 200b. FIGS. 9A and 9B depicts two further interlocking modular building blocks. In particular, FIGS. 9A and 9B depict a C shaped building block 200d sliding into an S shaped building block 200c. FIGS. 10A and 10B depicts two further interlocking modular building blocks. In particular, FIGS. 10A and 10B depict a C shaped building block 200d sliding into a T shaped building block 200a. FIGS. 11A and 11B depicts two further interlocking modular building blocks. In particular, FIGS. 11A and 11B depict a square shaped building block 200b sliding into an S shaped building block 200c. FIGS. 12A and 12B depicts two further interlocking modular building blocks. In particular, FIGS. 12A and 12B depict an S shaped building block 200c sliding into a T shaped building block 200a.

FIGS. 8A-12B described above depict only a subset of possible arrangements of the modular building blocks. The building blocks can be rotated and positioned in different orientations while still engaging the first finger section of one building block with the second finger section of another building block. Further, although only two building blocks are depicted as be connected together, furniture may be formed by more than two modular building blocks. While moving, rotating and/or sliding the modular building blocks to reconfigure assemble furniture has been depicted as a manual process, it will be appreciated that automating means such as motors, actuators, etc., could be used to assist and/or perform the reconfiguration of the modular building blocks as well as possibly control the connection between modular building blocks.

Figure 13A:
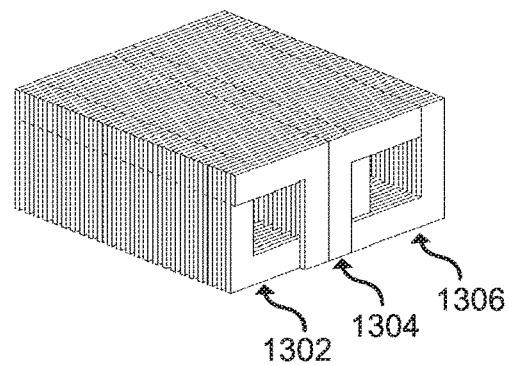
FIGS. 13A-13C depict further reconfigurable modular building blocks providing different pieces of furniture.
Figure 13B:
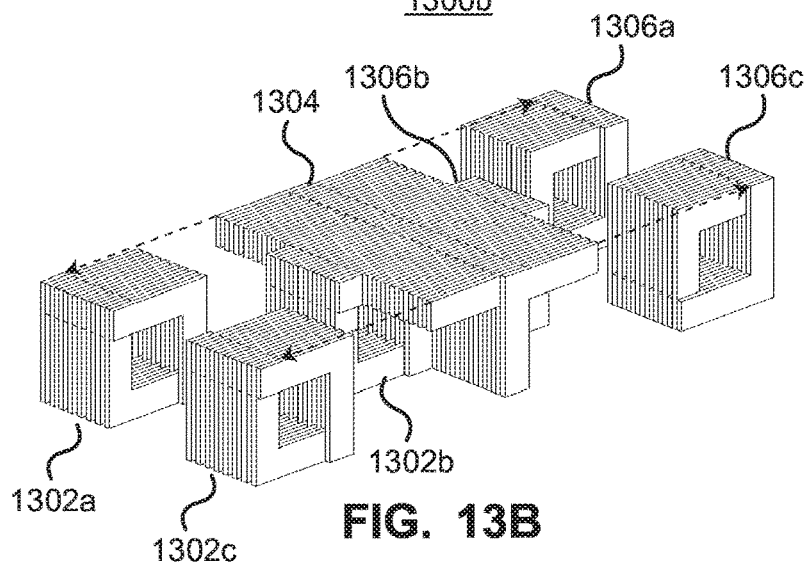
Figure 13C:
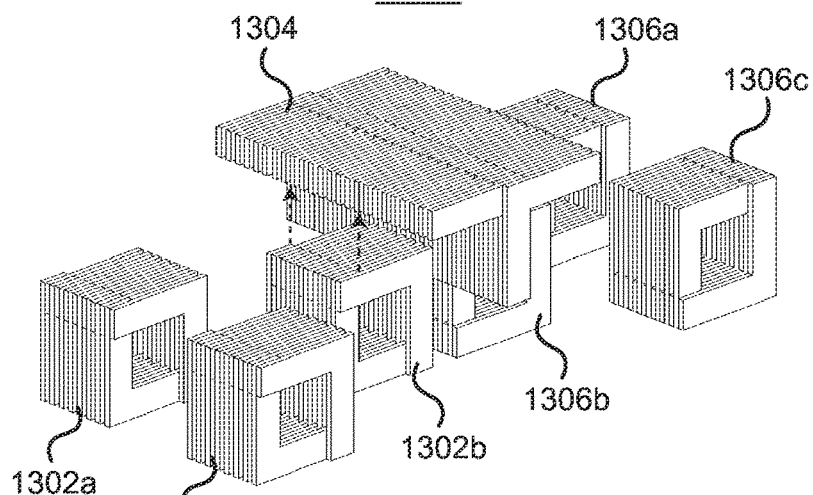

FIGS. 13A-13C depict further reconfigurable modular building blocks providing different pieces of furniture. FIG.

13A depicts a number of different modular building blocks arranged together to form a coffee table or platform 1300*a*. The coffee table 1300*a* may be formed by a number of square building blocks 1302 connected to T shaped building blocks 1304 and another set of square building blocks 1306. The modular nature of the individual building block shapes used to form the coffee table 1300*a* allows the building blocks to be reconfigured to provide some other functionality. For example as depicted in FIG. 13B, one or more of the square building blocks may be slid out from the coffee table and used as seats, stools or separate tables. As depicted four individual square building blocks 1302*a*, 1302*c*, 1306*a*, 1306*c* may be slid out from the other square building blocks 1302*b*, 1306*b* and the T shaped building block 1304 that provides the coffee table top. Accordingly, the coffee table 13000*a* may be reconfigured into a coffee table with seating 1300*b*. The modular building blocks may be further reconfigured as depicted in FIG. 13B in order to reconfigure the coffee table top provided by the T shaped building blocks 1304 into a raised table top and chairs 1300*c* depicted in FIG. 13C. The raised table top may be secured in position by one or more connecting components for securing the T shaped building block 1304 between the square building blocks 1302*b*, 1306*b* of the base. The connecting components may take various forms such as engaging finger sections that are straight and can fit across the bottom arms of the square bases 1302*b*, 1306*b* and provide a surface for the T shaped building blocks to sit on.

Other connection or supporting techniques are possible for securing the building blocks in position. The connection may be releasable in order to easily allow reconfiguration of the components. For example, a releasable connection may be provided by a bridging engageable finger section that provides a surface for another building block to rest on. The connection may be semi-permanent in that it requires some effort or tools for releasing. Semi-permanent connections may include the use of mechanical fasteners such as screws, nails, dowels or rods, the use of detents, or the use of magnets. The connections may also be permanent and join the building blocks together for example using adhesives or by welding. Further connections or additional features may be added to the modular building blocks. For example, a flat surface could be added to a coffee table to provide a smooth and substantially continuous surface suitable for a table top. Such connections or additional features could be releasable attached to the modular building blocks, semi-permanently attached to the modular building blocks, or permanently attached to the modular building blocks.

The modular building blocks are described above for use in providing furniture that is sized for use by adults. However, it will be appreciated that the size of the modular building blocks may be adjusted to either provide larger pieces or smaller pieces, possibly suitable for small dolls, miniature houses, or other toys. Further, while the furniture is described by way of various seats, benches and tables it is possible to use the modular building blocks to provide a wide range of furniture or other articles including pieces that may not normally be considered furniture. For example, the modular building blocks could be used to provide a holder for a cellphone, pens, or simply be used as a number of engageable components.

The modular building blocks may be provided as individual building blocks, pieces of furniture, pieces of reconfigurable furniture, or kits comprising a number of building blocks possibly including connecting components for assembling various pieces of furniture or other items. The modular building blocks may be formed from the same material, or different materials including cardboards, woods, plastics, and metals.

One or more illustrative embodiments have been described by way of example. It will be understood to persons skilled in the art that a number of variations and modifications can be made without departing from the scope of the invention as defined in the claims.

What is claimed is:

1. A modular building block for use in assembling furniture, the modular building block comprising:
   a plurality of interleaved layers, each of the interleaved layers having a first arm and a second arm, the plurality of interleaved layers providing:
   a first engageable finger section formed from the first arm of one or more of the plurality interleaved layers; and
   a second engageable finger section formed from the second arms of two or more interleaved layers separated by a respective layer of the one or more layers of the first engageable finger section, wherein the second engageable finger section receives a first engageable finger section of another modular building block when assembling the furniture.

2. The modular building block of claim 1, wherein the modular building block has a shape selected from the group consisting of:
   a "T" shape;
   a "C" shape; and
   an "S" shape.

3. The modular building block of claim 2, wherein each of the plurality interleaved layers for each shape of the group is formed from an "L" shaped basic building block.

4. The modular building block of claim 3, wherein one or more edges of the "L" shape are curved.

5. The modular building block of claim 2, wherein the modular building block is T shaped and the first engageable finger section is formed in a first arm of the T and the second engageable finger section is formed in another arm of the T that is parallel to and collinear with the first arm.

6. The modular building block of claim 2, wherein the modular building block is C shaped and the first engageable finger section is formed in a first arm of the C and the second engageable finger section is formed in another arm of the C that is parallel to and offset from the first arm, with the first engageable finger section and the second engageable finger section located on a same side of an overlapping section of the interleaved layers.

7. The modular building block of claim 2, wherein the modular building block is S shaped and the first engageable finger section is formed in an upper arm of the S and the second engageable finger section is formed in a lower arm of the S that is parallel to and offset from the upper arm, with the first engageable finger section and the second engageable finger section located on opposite sides of an overlapping section of the interleaved layers.

8. The modular building block of claim 1, wherein the first and second arms of each of the interleaved layers are arranged approximately perpendicular to each other.

9. The modular building block of claim 1, wherein the modular building block is formed from a unitary piece of material.

10. The modular building block of claim 1, wherein the modular building block is formed from separate interleaved layers joined together.

11. The modular building block of claim 1, further comprising a substantially continuous surface attached to a face of the modular building block.

12. A kit for assembling a piece of furniture comprising: at least two modular building blocks as claimed in claim 1.

13. The kit of claim 12, wherein the at least two modular building blocks comprise at least two different shapes.

14. The kit of claim 13, wherein the at least two different shapes are selected from the group consisting of:
a "T" shape;
a "C" shape; and
an "S" shape.

15. The kit of claim 13, further comprising a substantially continuous surface to be attached to a surface of at least one of the at least two modular building blocks.

16. The kit of claim 13, further comprising one or more attachment means for securing at least two of the modular building blocks together.

17. The kit of claim 16, wherein the attachment means comprises a rod securable through aligned holes passing through the first engageable finger section of a first one of the at least two modular building blocks and the second engageable finger section of a second one of the at least two modular building blocks.

18. The kit of claim 13, wherein the furniture assembled from the kit is reconfigurable and comprises a first configuration of the at least two modular building blocks providing a first functionality to the furniture and a second configuration of the at least two modular building blocks providing a second functionality to the furniture.

19. A piece of furniture assembled from a plurality of modular building blocks as claimed in claim 1.

20. A modular building block for use in assembling furniture, the modular building block comprising:
a plurality of interleaved layers, each of the interleaved layers having a first arm and a second arm, the plurality of interleaved layers:
a first engageable finger section formed from the first arm and second arm of one or more of the plurality interleaved layers; and
a second engageable finger section formed from the first arms and second arms of two or more interleaved layers different from the one or more layers of the first engageable finger section, the two or more interleaved layers of the second engageable finger section separated by a respective layer of the one or more layers of the first engageable finger section, wherein the second engageable finger section receives a first engageable finger section of another modular building block when assembling the furniture,
wherein the modular building block is square shaped.

* * * * *